United States Patent Office 2,746,009
Patented May 15, 1956

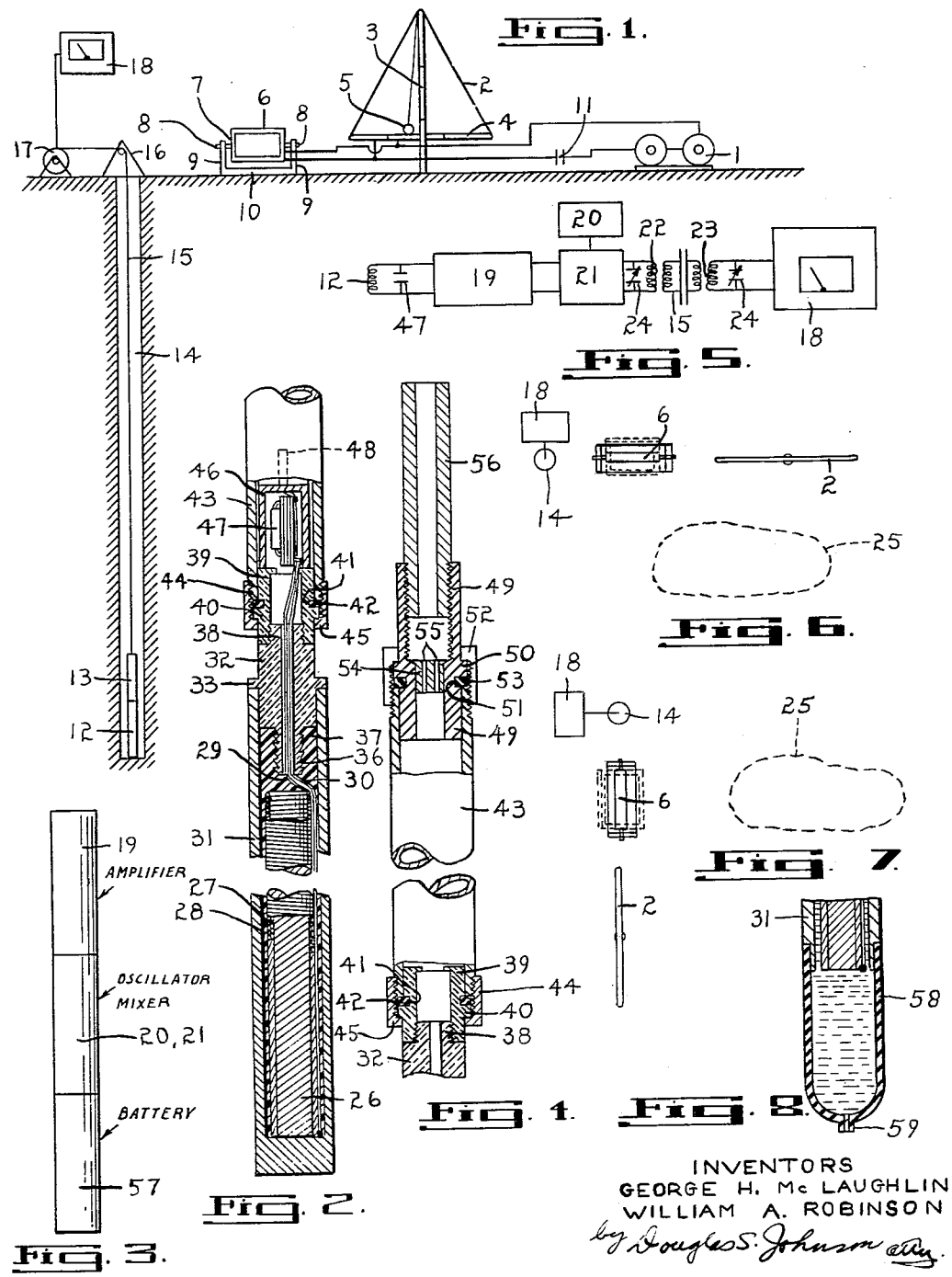

2,746,009

ELECTROMAGNETIC DRILL HOLE EXPLORATION METHOD AND APPARATUS

George H. McLaughlin and William A. Robinson, Toronto, Ontario, Canada, assignors to The McPhar Engineering Company of Canada Limited, Toronto, Ontario, Canada Application December 24, 1951, Serial No. 263,098

6 Claims. (Cl. 324—6)

The invention relates to the exploration for underground conductor ore bodies and more particularly to an electromagnetic drill hole exploration method and apparatus therefor.

The principal object of the invention is to provide a simple and reliable electromagnetic method of determining the presence and location of a subterranean conductor ore body by exploration down a drill hole.

A further important object is to provide a method which can be carried out by means of simple apparatus which can be easily carried into terrain unaccessible to vehicles or motorized transport.

Still a further object is to provide apparatus as aforesaid which will provide a high degree of sensitivity in detection, which will be easy to operate and which will give readily interpretable results for locating the conductor ore body.

Another object is to enable an electromagnetic survey to be carried out efficiently in a minimum of time, eliminating the painstaking and laborious techniques required by many of the existing electromagnetic, magnetic and resistivity methods for any significant results. In this connection it is to be noted that the resistivity methods fail to use the effect of the large conductivity ratio of the ore body and surrounding rock and therefore do not give as effective an indication as electromagnetic methods.

The principal feature of the invention resides in distinguishing down a drill hole any secondary electromagnetic fields set up by the linking of an alternating primary electromagnetic field with a subterranean conducting ore body.

A further important feature resides in determining the direction of the dynamic magnetic component of the secondary field relative the dynamic magnetic component of the primary field down the drill hole and utilizing this information regarding the directions of the dynamic magnetic components (hereinafter referred to as magnetic components) as an indication of the direction of the conductor body.

Still a further important feature resides in distinguishing the signal detected down the drill hole so that it can be delivered to and measured at the surface in the presence of a strong, primary electromagnetic field.

More specifically, the invention resides in creating a primary electromagnetic field to link with a subterranean conductor ore body giving rise to a secondary electromagnetic field spacially out of phase with the primary field, detecting the spacially out-of-phase magnetic component of the secondary field down a drill hole while ignoring the magnetic component of the primary field, creating an auxiliary primary electromagnetic field having its magnetic component variable in direction from the magnetic component of the main primary field, measuring the detected signal while varying the direction of the magnetic component of the auxiliary primary to cancel out the spacially out-of-phase secondary field magnetic component for minimum detected signal and observing the direction of the magnetic component of the auxiliary primary field for minimum signal as an indication of the direction of a conductor body linked by the primary fields.

The signal detected down a drill hole is distinguished and delivered to the surface for measurement in the presence of the strong primary field by either rectifying down the drill hole and delivering the D.-C. signal for measurement or modulating and/or mixing the detected signal with a signal of frequency $F_2$ distinguishing from the frequency $F_1$ of the main and secondary fields, and delivering the resultant signal $F_3 = F_1 \pm aF_2$, where "$a$" is any whole number, to the surface.

In particular the method is carried out by energizing with a signal frequency $F_1$, a main transmitting coil, preferably arranged vertically on the surface and directed towards the drill hole, and arranging a horizontal receiving coil down the drill hole to ignore the direct primary field of the transmitting coil while detecting the spacial out-of-phase component of any secondary field created by currents induced in a conductor body by the primary field. The detected signal mixed with a signal of frequency $F_2$ is fed to a detector responsive to the resultant signal $F_3 = F_1 \pm aF_2$ and the vernier transmitting vertical coil directed towards the drill hole is arranged to rotate on an axis in the direction of its alignment and is rotated to provide a signal linking with the receiver coil to balance out the spacial out-of-phase component of the secondary field as indicated by a minimum in the signal $F_3$. The angle of rotation of the vernier then is an indication of the direction of the conductor body.

By setting the main and vernier transmitting coils up at right angles to their original position and taking readings with the receiver coil at intervals down a hole the position of the conductor body can be accurately obtained as well as important information regarding its size and the nature of the conductor.

A further important feature resides in providing a novel receiver coil unit for introduction into a drill hole.

Another feature resides in mixing the signal frequency $F_2$ with the output signal from the receiver coil and amplifying the resultant signal in the drill hole at the receiver coil so that the problem of signal attenuation up the drill hole is overcome.

A further feature resides in forming the signal generating and transmitting apparatus of lightweight construction comprising frames which can be readily set up and dismantled to support the transmitting coils to be energized by a portable alternating frequency source.

These and other objects and features will become apparent from the following description taken in conjunction with the accompanying drawings in which Figure 1 is an elevational more-or-less diagrammatic view of the apparatus for carrying out the method.

Figure 2 is a vertical sectional detail of the receiver coil unit and showing its connection to the amplifier unit.

Figure 3 is a cylindrical block diagram of the receiver amplifier-mixer unit adapted to be mounted in the amplifier tube.

Figure 4 is a part elevational part vertical sectional detail of the amplifier tube showing its connection to the receiver coil and the manner in which the ends are sealed.

Figure 5 is a schematic diagram mostly in block form of the receiver system.

Figure 6 is a diagrammatic plan view illustrating one setup of the apparatus for detecting a subterranean conductor.

Figure 7 is a view similar to Figure 6 showing the apparatus set up in right angular relation to Figure 6.

Figure 8 is a fragmentary sectional view of an alternative form of receiver coil unit capable of withstanding drill hole pressures.

The use of mutually perpendicular transmitting and detecting coils to carry out the electromagnetic surveying is well known in the art. United States Patent 2,558,972 of July 3, 1951, describes a method wherein a vertical transmitting coil is employed to create a primary magnetic field linking with a subterranean conductor anomaly to create a secondary magnetic field which will disturb the spacial angle of the magnetic field set up by the transmitting coil. A receiver coil disposed with its turns normally in a horizontal plane is arranged to be tilted to incline the coil turns to the horizontal to provide a minimum signal response to the resultant of the primary and secondary magnetic fields. The tilt of the detector coil indicates the change of the spacial angle of the magnetic field set up by the transmitting coil due to the presence of the conductor anomaly and indicates the presence of such conductor anomaly.

The present invention has its prime object the improvement of such an electromagnetic exploration method and to enable exploration to be carried out down a drill hole.

With the previous method referred to the moment that the horizontal receiver coil is tilted from the horizontal it is cut by lines of force from the main primary field and weaker secondary fields are liable to be masked by the strong primary field. In addition spurious results are likely to be encountered because of the use of detector and indicating devices which are tuned to the frequency of the primary field and are in fact in the presence of a strong primary field.

The sensitivity of the existing equipment is also dependent upon the depth of the conductor anomaly with the field strength rapidly falling off with increase in the depth of the conductor below the ground surface.

The present invention provides for tilting the transmitting element and for introducing preferably the detector coil down a drill hole so that the distance between the detector and the conductor anomaly will be decreased while the distance between the detector and the transmitting coil will be increased, rendering the effects of any direct linkage by the primary field with the detector coil of much lesser consequence. Again the existence of anomalous fields or signals giving rise to spurious results is eliminated by distinguishing the signal picked up by the receiver coil from any anomalous signal and recording the detected signal only.

Further, the prior methods have been improved by supply a cancellation magnetic component to cancel out the field component created by the presence of a conductor body by means of a vernier transmitting coil which will enable the angle of the resultant primary and secondary fields to be more accurately determined than heretofore to provide a more accurate and useful indication of the presence and location of the anomaly.

With reference to Figure 1, a typical setup employing the present method is disclosed with the apparatus being shown in more-or-less diagrammatic form. The transmitting equipment comprises a motor generator indicated at 1 and this unit preferably comprises the portable unit disclosed in the said Patent 2,558,972.

The main transmitting coil 2 comprises a loop of wire suspended from a sectional aluminum pole 3 and spread to generally triangular form by means of a sectional aluminum spreader bar 4 suspended from the mast as at 5, or otherwise suitably secured.

Connected in parallel with the main transmitting coil is a vernier coil 6 which comprises a coil wound on a frame 7 having pin projections 8 which set in suitable notches in the uprights 9 carried by a plywood base 10 to support the coil for rotation out of a vertical plane toward the horizontal plane. The transmitting coils are preferably tuned by condenser 11 and the vernier coil may be connected in series as well as parallel but operating at the same frequency as the main transmitting coil to produce an electromagnetic field of frequency $F_1$.

The receiver unit or system comprises an iron cored detector coil 12 arranged with its turns in a horizontal plane, an amplifying oscillator and mixing unit indicated at 13. The detector coil 12 and unit 13 are lowered into a drill hole 14 by means of a cable 15 passing over a suitable support 16 arranged above the mouth of the hole and wound on a drum or hoist 17, the cable connecting the output of the units 12 and 13 to an indicator 18 preferably a vacuum tube volt-meter tuned to the frequency of the signal delivered up the cable.

Referring to Figure 5, the detector coil 12 is shown as feeding the amplifier 19 of unit 13, and this amplifier is tuned to frequency $F_1$ which is the frequency of the signal generated by the detector coil in the presence of the secondary field created by the linking of a conductor anomaly by the primary field from the transmitting coil 2.

The oscillator 20 comprising the oscillator portion of unit 13 is tuned to produce a signal of frequency $F_2$ and this signal is delivered to the mixer 21 producing a resultant signal $F_3 = F_1 \pm aF_2$ where "$a$" is any whole number. That is, the resultant signal $F_3$ may be made up of the signal $F_1$, and the fundamental signal from the oscillator $F_2$ or any useable harmonic thereof.

The cable 15 is shown in Figure 5 as a balanced line transformer-coupled at 22 to the output of the mixer 21 and at 23 to the input of the vacuum tube voltmeter circuit represented in block form at 18. The coupling circuits are preferably tuned by suitable condensers 24.

In carrying out the method according to the invention the main transmitting coil 2 and the vernier coil 6 are both oriented so that their planes are directed towards the mouth of the drill hole with the vernier coil vertical. The detector coil 12 and the unit 13 are lowered down the drill hole to a position which may be considered as station 1. With the main and vernier coils energized by the source 1 the signal $F_3$ measured by the vacuum tube voltmeter 18 is noted. The vernier transmitter coil 6 is then rotated about its horizontal axis for minimum signal $F_3$ and the inclination of the vernier coil noted as an indication of the direction of the conductor anomaly 25.

The fact that there is a conductor anomaly present will give rise to a secondary electromagnetic field of frequency $F_1$ which will be spacially out of phase with the primary electromagnetic field of frequency $F_1$ producing a resultant field having a spacial angle inclined to the angle of the field set up by the transmitting coil. That is, the main transmitting coil 2 produces a field having a magnetic component horizontal at coil 12. The horizontal detector coil 12 will ignore this primary horizontal magnetic component.

The presence of the anomalous conductor 25 produces a vertical magnetic component which will cut coil 12 giving rise to a signal therein. This signal amplified and mixed with a signal of frequency $F_2$ to produce the signal of frequency $F_3$ is the signal measured by the vacuum tube voltmeter.

Spurious signals will be eliminated by frequency discrimination so that the effects of direct pick-up of the primary field, for instance, in the cable 15 or other parts of the receiving equipment, will be eliminated.

The tilting of the vernier coil 6 produces a vertical primary magnetic component which may be made to cancel out the vertical component due to the presence of the conductor anomaly. The vernier coil is thus rotated for minimum signal $F_3$ in the indicator 18 and it will be known that the direction of the magnetic field produced by the vernier coil is aligned with the direction of the magnetic field resulting from the presence of the conductor.

In Figure 6 the vernier coil 6 is shown in its vertical position in solid line and shown in its dipped position in dotted line, and it will be noted that the plane of the coil points towards the conductor anomaly. This occurs for one set of circumstances, namely, where the receiver coil is above the conductor anomaly which is a good conductor.

Figure 7 shows the same setup as Figure 6 but with the main transmitting coil 2 and vernier coil 6 rotated through 90°. The dip on the vernier coil again indicates the direction of the conductor body 25, and it will be seen that with the two readings of Figures 5 and 6 the quadrant of the conductor will be located. After these readings have been made the receiver coil 12 and unit 13 may be lowered to what may be considered station 2, and a similar set of readings taken. In this way accurate information as to the location, extent and even conductivity characteristics can be determined.

For specific construction of the drill hole units 12 and 13 reference is to be had to Figures 2 and 4. The receiver coil comprises an iron core 26 upon which is wound core layers 27 and 28. Lead 29 connects to the high side of the coil and lead 30 connects to a shield ground. The whole unit is encased in a Bakelite tube 31 which may be closed at its lower end by any suitable plug means or otherwise, and closed at its upper end by a brass plug 32 having a flange 33 abutting the end wall of the tube 31 and having a grooved neck extension 36.

The interior of the tube 31 is preferably filled with a plastic material 37 to complete the seal of the unit and embed and lock the neck portion 36 of the plug 32 in position.

Threading on to the reduced upper end 38 of the plug 32 is a fitting 39 having an annular flange 40 above which is an annular groove 41 to receive a packing in the form of a neoprene washer 42. The upper end of fitting 39 is of a size to fit within the amplifier tube or housing 43. A collar 44 having an internal flange 45 forming a shoulder to engage the flange 40 of the fitting 39 forms the means of connecting the coil unit 12 to the amplifier unit 13. This collar 44 upon threading onto the end of tube 43 compresses the washer 42 against the lower end of the tube 43 by means of flange 40 to provide a sealed joint.

Arranged in the fitting 39 is a cylindrical housing 46 carrying tuning condenser 47 for the coil. Housing 46 terminates in a pin projection 48 which carries the output of the coil to the amplifier unit 13.

The components of the unit 13, namely, the amplifier 19, oscillator 20 and mixer 21, are standard circuit arrangements using the small variety type tubes and are shown simply in block form Figure 3 arranged as cylinders to fit within the amplifier tube 43. The seal of the upper end of tube 43 is shown in Figure 4. Here a plug 49 provided with an annular flange 50 above an annular groove 51 fits in to the end of the tube and a collar 52 similar to the collar 44 compresses a neoprene washer 53 within the groove 51 between the annular flange 50 and the upper end of the amplifier tube.

The plug or fitting 49 has a central bore in which is received the plug 54 having passages 55 through which conductor leads may be led. The conductor leads, not shown, may be led away through tube 56 threaded in the end of the fitting 49 and the tube clamped or fastened to the cable 15 in any suitable manner. The tube 56 and fitting 49 may be filled with a plastic material and sealed against the entry of either moisture or air.

With the units 12 and 13 down the drill hole they are subject to very high external pressures corresponding to their depth. The coil or detector unit 12 will be a completely sealed unit and will be substantially unaffected by the pressure since it comprises, when filled with plastic, a solid cylindrical unit. The unit 13 however leaves the circuit elements of the amplifier, oscillator and mixer, together with the battery unit 57, accessible for replacement and repair, and the amplifier tube must be sealed at the ends to prevent the external pressure effecting circuit elements.

The arrangement of the collars 44 and 52 compressing the neoprene washers 42 and 53 between the end fitting flanges 40 and 50 and the ends of the amplifier tube 43 provide this seal. Upon increase of external pressure the fittings or plugs 39 and 49 will be urged inwardly of the tube. Thus the pressure pressing the washers 42 and 53 will be increased to increase the effectiveness of the seal at the tube ends.

Upon bringing the units 12 and 13 to the surface the collars 44 and 52 may be quickly removed, the detector coil unplugged from the amplifier unit 13 and the whole assembly of amplifier 19, oscillator 20, mixer 21 and batteries 57 withdrawn from the amplifier tube for inspection, repair or replacement.

Figure 8 shows a somewhat modified form of receiver coil in which the Bakelite tube 31 has a flexible tubular extension 58 at the lower end thereof provided with a fitting 59 for introducing oil to fill the tube in place of the plastic 37.

As the unit is lowered into the drill hole the external pressure will progressively collapse the extension 58 forcing the oil under increasing pressure into tube 31 to maintain the internal and external pressure substantially equal whereby the tube 31 can withstand pressures encountered even in the deepest drill holes.

While the use of the oscillator 20 and mixer 21 is particularly disclosed as the method of distinguishing the detected signal down the drill hole, such detected signal may also be modulated or rectified and delivered to the surface as a D. C. signal so that it can be measured in the presence of the strong primary field.

It is to be understood that variations, such as means for accomplishing the distinguishment of the detected signal and like variations and modifications in the equipment used may be made without departing from the scope of the appended claims.

What we claim as our invention is:

1. A drill hole exploration method, comprising creating at the surface from which a drill hole leads a main primary alternating electromagnetic field to link with a subterranean conductor body to create a secondary electromagnetic field, creating at the surface from which the drill hole leads an auxiliary primary electromagnetic field of the same frequency as said main primary field and having its magnetic component rotatable relative to the direction of the magnetic component of said main primary field, detecting any magnetic component of said secondary electromagnetic field down the drill hole spacially out of phase with the main primary magnetic field without detecting, amplifying and measuring the detected out-of-phase secondary magnetic field component, varying the direction of the magnetic component of the auxiliary primary field for minmum detected signal, and measuring the direction of the magnetic component of the auxiliary primary field for minimum signal as an indication of the direction of the conductor body.

2. A drill hole exploration method comprising creating at the surface from which a drill hole leads a main primary alternating magnetic field of frequency $F_1$ to link with a subterranean conductor to create a secondary alternating magnetic field of frequency $F_1$, creating at the surface from which the drill hole leads an auxiliary alternating magnetic field of frequency $F_1$ having the direction of its magnetic component rotatable relative to the direction of magnetic component of said main primary field, detecting said secondary electromagnetic field down the drill hole, creating a signal of frequency $F_2$, mixing the detected signal field strength with said signal of frequency $F_2$, measuring the resultant signal of frequency $F_3 = F_1 \pm aF_2$ while varying the direction of said auxiliary primary field for minimum signal $F_3$, and recording the direction of the auxiliary primary field for minimum signal $F_3$ as an indication of the direction of a conductor body linked by the primary field.

3. An exploration method down a drill hole comprising inducing a secondary alternating magnetic field in the vicinity of the drill hole by linking a subterranean conductor body with a primary alternating magnetic field created by means of source located at the surface from which said drill hole leads, said primary field having its magnetic component cutting the drill hole substantially horizontally the secondary magnetic field having a vertical magnetic component extending down the drill hole, detecting only the vertical magnetic component of the secondary field down the drill hole, converting a signal produced on detection of the vertical magnetic component to a signal distinguishable for measurement in the presence of the primary alternating magnetic field from primary field signals, measuring the detected signal above the drill hole while introducing a vertical primary field magnetic component down the drill hole to cancel out the vertical secondary field component as indicated by minimum detected signal, and measuring the inclination of the resultant of the horizontal and the introduced vertical primary field components as an indication of the direction of the conductor body.

4. An exploration method down a drill hole, comprising inducing a secondary alternating magnetic field of frequency $F_1$ by linking a subterranean conductor body with a primary alternating magnetic field by energizing a vertical transmitting coil located at the surface from which a drill hole leads and directed at the drill hole with an alternating current with frequency $F_1$, detecting any vertical magnetic component of the secondary field down the drill hole by means of a horizontal receiving coil located down the drill hole, converting any detected signal to a signal having a frequency $F_2$ differing from the frequency $F_1$, measuring the signal $F_2$ while introducing a vertical primary field magnetic component of the frequency $F_1$ down the drill hole by means of a vernier transmitting coil directed towards the drill hole and rotatable about a horizontal axis directed towards the drill hole, rotating said vernier transmitting coil for minimum signal $F_2$, and measuring the tilt of said vernier coil as an indication of the direction of the conductor body.

5. A method as claimed in claim 4, in which measurements of the tilt of said vernier coil are made with said transmitting coil and said vernier coil in different positions of orientation about the drill hole with said receiver coil at one position of depth in said drill hole, said observations being repeated with said receiver coil at another position of depth in said drill hole.

6. A drill hole exploration method comprising creating a main primary alternating magnetic field of frequency $F_1$ having its magnetic component cutting the drill hole substantially horizontally by means of a substantially vertical transmitting coil located adjacent a drill hole and having its plane directed towards the drill hole, creating an auxiliary primary alternating magnetic field of frequency $F_1$ by means of a vernier transmitting coil having its plane directed towards the drill hole and rotatable about a substantially horizontal axis lying in its plane to vary the direction of its magnetic component down the drill hole from the horizontal towards the vertical, detecting by means of a substantially horizontal receiving coil located down a drill hole the vertical magnetic components of any secondary alternating magnetic field of frequency $F_1$ created by the linking of said primary alternating magnetic fields with a subterranean conductor by mixing the signal detected by the receiver coil with a signal of frequency $F_2$ to produce a signal $F_3 = F_1 \pm aF_2$, measuring the signal $F_3$ while rotating said vernier coil to link said auxiliary primary field magnetic component with said receiver coil to cancel out any vertical magnetic components detected by said receiver coil as indicated by minimum signal of frequency $F_3$, and measuring the angle of said vernier coil for minimum signal $F_3$ as indication of the direction of a conductor body.

References Cited in the file of this patent
UNITED STATES PATENTS

| | | |
|---|---|---|
| 1,820,953 | Sundberg et al. | Sept. 1, 1931 |
| 1,938,534 | Peters | Dec. 5, 1933 |
| 2,202,656 | Haynes | May 28, 1940 |
| 2,220,070 | Aiken | Nov. 5, 1940 |
| 2,220,788 | Lohman | Nov. 5, 1940 |
| 2,264,318 | Lee | Dec. 2, 1941 |
| 2,304,051 | Beers | Dec. 1, 1942 |
| 2,398,761 | Aiken | Apr. 23, 1946 |
| 2,426,918 | Barret | Sept. 2, 1947 |
| 2,501,953 | Martin | Mar. 28, 1950 |
| 2,527,559 | Lindblade et al. | Oct. 31, 1950 |
| 2,542,462 | Beard | Feb. 20, 1951 |
| 2,569,625 | Wyllie | Oct. 2, 1951 |
| 2,573,133 | Greer | Oct. 30, 1951 |
| 2,608,602 | Muffly | Aug. 26, 1952 |